United States Patent [19]
de Vries et al.

[11] Patent Number: 5,819,032
[45] Date of Patent: Oct. 6, 1998

[54] ELECTRONIC MAGAZINE WHICH IS DISTRIBUTED ELECTRONICALLY FROM A PUBLISHER TO MULTIPLE SUBSCRIBERS

[75] Inventors: Pierre de Vries, Kirkland, Wash.; Miles Kronby, New York, N.Y.; Suze Woolf, Seattle, Wash.

[73] Assignee: Microsoft Corporation, Redmond, Wash.

[21] Appl. No.: 644,967

[22] Filed: May 15, 1996

[51] Int. Cl.⁶ .............................. G06F 13/00; G06F 3/00
[52] U.S. Cl. ............................. 395/200.8; 395/200.47; 345/326; 345/348; 345/349
[58] Field of Search .................. 395/200.8, 200.3, 395/200.47; 345/326, 329, 333, 334, 347, 348, 349, 350, 351, 352

[56] References Cited

U.S. PATENT DOCUMENTS

| | | | |
|---|---|---|---|
| 5,422,993 | 6/1995 | Fleming | 395/159 |
| 5,490,244 | 2/1996 | Isensee et al. | 395/159 |
| 5,497,422 | 3/1996 | Tysen et al. | 380/25 |
| 5,506,902 | 4/1996 | Kubota | 380/9 |
| 5,524,193 | 6/1996 | Covington et al. | 395/154 |
| 5,539,735 | 7/1996 | Moskowitz | 370/60 |
| 5,551,030 | 8/1996 | Linden et al. | 395/600 |
| 5,608,860 | 3/1997 | Fitzpatrick et al. | 395/352 |
| 5,630,103 | 5/1997 | Smith et al. | 395/500 |
| 5,638,443 | 6/1997 | Stefik et al. | 380/4 |

*Primary Examiner*—James P. Trammell
*Assistant Examiner*—Patrick Assovad
*Attorney, Agent, or Firm*—Lee & Hayes, PLLC

[57] ABSTRACT

An electronic magazine is distributed electronically over a network (e.g., Internet) from a publisher to multiple subscribers. In an initial timeline navigation screen depicted on the subscriber's computer display, articles are graphically represented in a graphical user interface as article boxes overlaid on a background. A marker is added to the article boxes to indicate that comments to the underlying article have been published as part of the magazine. To view the various comments for a particular article, the subscriber activates the article box to launch a second screen which includes the selected article box positioned prominently, and one or more graphical comment boxes indicative of the commentaries surrounding the article box. This second screen thereby provides a message thread of articles and related commentaries. An alternative approach to building a message thread is to launch a pop-up graphical list window from activation of the selected article which lists related commentaries. To submit a commentary on an article, the subscriber locates a file containing a previously drafted comment and drags a file icon representing the comment file to a submission target on the magazine's graphical user interface. The subscriber drops the file icon on the submission target which causes the computer to automatically send the comment file, along with identification of the article to which the comment relates, over the network to the publisher. The publisher can then review the commentary and at their discretion, add the commentary to the magazine or discard it. A time line showing the temporal relationship of when articles and commentaries are published within a publishing period is also provided as part of the graphical user interface. As an indicator is moved along the time line, the graphical article boxes are added to or removed from the screen to demonstrate which articles were published at which times within the publishing period.

25 Claims, 5 Drawing Sheets

Fig. 5

ELECTRONIC MAGAZINE WHICH IS DISTRIBUTED ELECTRONICALLY FROM A PUBLISHER TO MULTIPLE SUBSCRIBERS

BACKGROUND OF THE INVENTION

Proposed electronic magazines are a high-tech cousin to familiar paper-based magazines. Unlike traditional paper magazines which are distributed physically using mail carriers or other couriers, electronic magazines will be distributed electronically to the subscriber. One distribution medium that publishers are expected to use is a public network, such as the Internet. The publisher will distribute the magazine, or parts of it, online over the network to subscriber computers. The subscriber will then be able to browse contents and read various articles in the online magazine using a computer and display.

Presently contemplated online magazines will be dynamic and expected to grow in content as new items or stories are added. The traditional constraints, such as paper, printing, and distribution costs, are substantially removed in the electronic arena. New items can simply be added by pointing to a new or related source of information on the network. For example, an online magazine may have a monthly theme that is elaborated as new stories are added day by day.

The interactive nature of a network will also make it very easy for readers to react to feature stories. Subscribers are expected to submit commentary on articles at a much higher rate than experienced in paper-based magazines. Reader reaction will contribute to growth in the magazine's content as readers submit commentaries or related materials of interest which the publishers might deem worthy of publishing.

In a network setting, publishers will be able to offer ready access to large amounts of information beyond the magazine through the use of hyperlink tools, such as hypertext markup language (HTML). With such tools, readers will expect convenient bridging from the feature article to a related commentary on the article.

The wealth of information, dynamically evolving content, and rich interconnections to a growing pool of media types will make it difficult for publishers to present a collection of stories to subscribers in an intuitive and usable way. For instance, as related commentaries are added to the magazine articles, there is a need to show a message thread of articles and magazines that affords context and intuitive interrelationship. A "message thread" is a set of linked messages, or in this case articles and related commentaries. For instance, a message thread might consist of an article, commentaries on the article, commentaries on the commentaries, and so on. Pointers provide connections from one message to the next.

In conventional bulletin board systems, a message thread is arranged in a hierarchy achieved by indentation or other text formatting. For example, a newsgroup browser employed in the Microsoft Network (MSN) uses the following hierarchy:

⇨ Message 1
  Re: "Message 1"--title of response 1 to Message 1
    Re: "Message 1"--title of response 1 to response 1 to Message 1
    Re: "Message 1"--title of response 2 to response 1 to Message 1
  Re: "Message 1"-- title of response 2 to Message 1
  Re: "Message 1"-- title of response 3 to Message 1
    Re: "Message 1"--title of response 1 to response 3 to Message 1

The hierarchy also provides an indication of relative timing among the responses. The message thread lists the feature message first, followed by responses in chronological order corresponding to their time received. Listing the response 2 to the feature message after the response 1 in the message thread indicates that response 2 was received after response 1.

An alternative technique to presenting a message thread is to allow the user to arrange the order in which messages are presented. For example, in an electronic mail program, such as Microsoft Exchange from Microsoft Corporation, the user can organize e-mail messages alphabetically by sender, or alphabetically by subject title, or chronologically by time received.

Conventional techniques for presenting a message thread, such as those in bulletin boards or electronic mail programs, have a drawback in that the display is text only. The display gives very little context to the message. For this reason, conventional message thread formats are not very suitable for an online electronic magazine. It would be advantageous to design a message thread for such magazines that imparts context and intuitive relationships among the stories and commentaries which a subscriber can easily understand.

Electronic bulletin boards and electronic mail programs permit the reader to respond to a message in the message thread. A reader activates the message on which he/she wishes to comment using conventional techniques (highlight-and-enter with a keyboard, or point-and-click with a mouse). The reader then prepares a response by opening an authoring tool which is typically embedded as part of the text editor in the bulletin board or mail program. Using the authoring tool, the reader drafts the response. The reader submits the response by activation of a "send" command or the like.

This presents another drawback. The reader is limited to the authoring tool provided by the maker of the browser. Such tools are often limited in functions. It would be advantageous to enable the reader to use a separate authoring tool that is less limited to create message responses. Furthermore, it would be beneficial to design a more convenient method for submitting responses to articles in the online magazine environment.

SUMMARY OF THE INVENTION

This invention concerns an electronic magazine which is distributed electronically over a network (e.g., Internet) or broadcast medium (e.g., satellite or terrestrial television channels) from a publisher to multiple subscribers. The electronic magazine, or parts thereof, are downloaded to a subscribers home computer. The user can browse the magazine content and read various articles from the computer.

One aspect of this invention pertains to a method for presenting a message thread of articles which appear in the electronic magazine and comments related to the articles. The articles are presented as part of a graphical user interface that is depicted on the subscriber's display. In the described implementation, the articles are graphically represented as article boxes overlaid on a background pattern. The article boxes might include a title and picture associated with the content of the article. The article boxes are arranged somewhat randomly on an initial or timeline navigation screen with a feature article positioned prominently in the center (or some other prominent location) and other articles dispersed about the feature article.

A marker is added to the article boxes to indicate that comments to the underlying article have been published as part of the magazine. To view the various comments for a particular article, the subscriber activates the article box to launch a second screen in the graphical user interface which includes the selected article box positioned centrally (or in some other prominent location), and one or more graphical comment boxes indicative of the commentaries surrounding the article box. This two-dimensional to two-dimensional nesting provides a message thread that intuitively relates the article and associated commentaries.

An alternative approach to building a message thread is to launch a pop-up graphical list window from activation of the selected article. The list window is overlaid partly on the selected article box and contains a list of comments related to the magazine article represented by the selected article box. This two-dimensional screen with a pop-up list also provides a useable message combines graphics and text to provide the desirable context.

Another aspect of this invention pertains to a method for submitting a comment relating to an article which appears in the electronic magazine. When the user wishes to submit a commentary on an article, the subscriber first locates a file containing the comment. The comment is previously drafted by the subscriber using his/her word processing application and stored as a file in a known directory. The subscriber drags a file icon representing the comment file to a submission target on the magazine's graphical user interface. The submission target is associated with the article and may consist of a special label within the article box, or of the article box itself. The subscriber drops the file icon on the submission target which causes the computer to send the comment file, along with identification of the article to which the comment relates, over the network or other back channel to the publisher. The publisher can then review the comment and at their discretion, add the comment to the magazine or discard it. If added, the comment is then presented as part of the message thread on the magazine.

Still another aspect of this invention pertains to a method for showing the time relationship among articles, or among articles and their related comments. The online magazine publishes various articles throughout a publishing period. As part of the graphical user interface, a time line encompassing the publishing period is presented. An indicator is also shown along the time line. The subscriber can slide the indicator along the time line to identify different times within the publishing period. As the indicator is moved, the graphical article boxes representing the articles are added or removed from the screen to demonstrate which articles were published at which times within the publishing period. For instance, when the indicator points to a point on the time line corresponding to the beginning of the publishing period, the article box for the feature article is displayed. Then, as the subscriber moves the indicator along the time line toward a point corresponding to the end of the publishing period, more article boxes are added to represent when the articles were published relative to the publishing period. The time line can be represented in two-dimensional or three-dimensional space.

DETAILED DESCRIPTION OF THE PREFERRED EMBODIMENT

Figure 1:
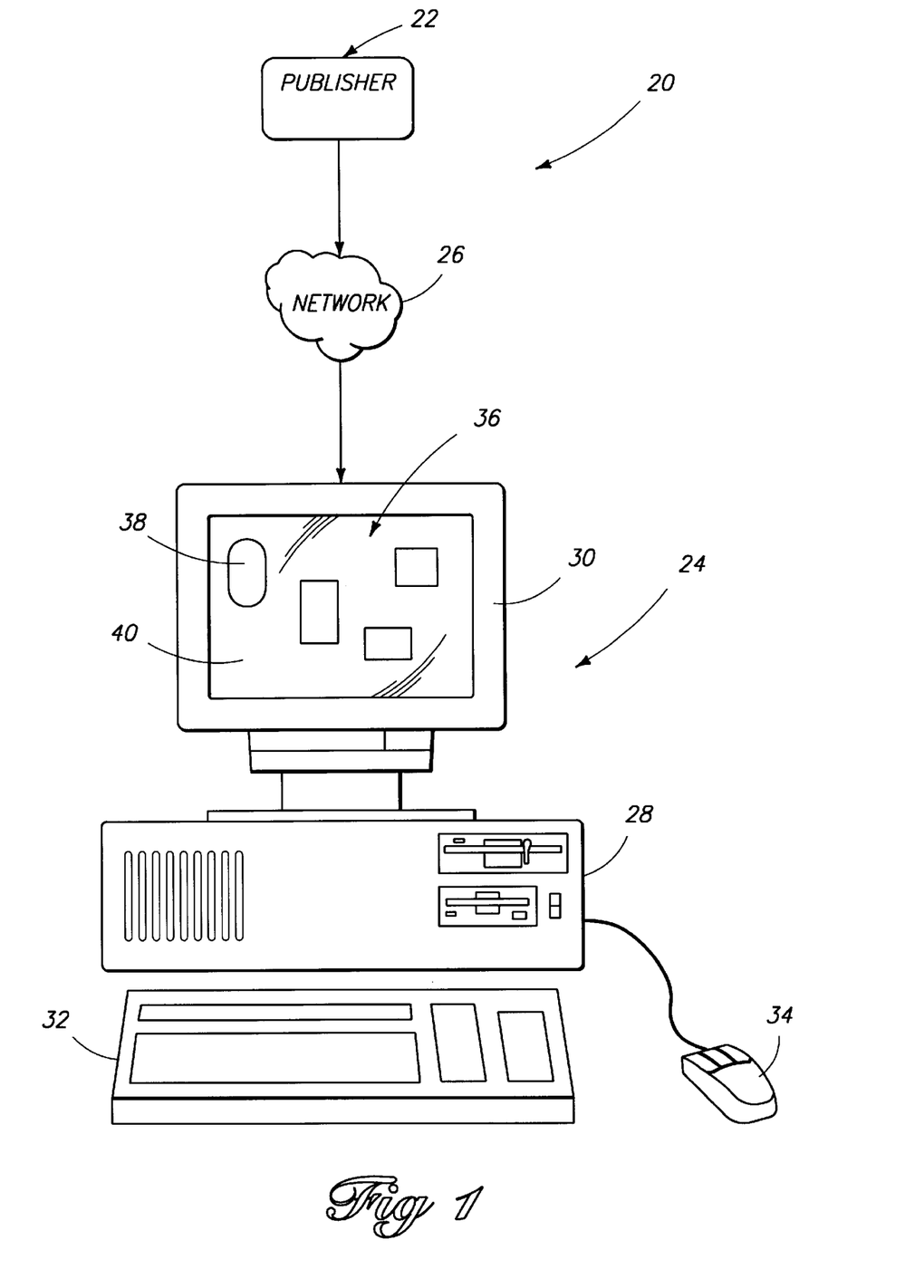
FIG. 1 is a diagrammatic illustration of an online magazine system in which an electronic magazine is electronically distributed from a publisher over a network to a subscriber.

FIG. 1 shows an online magazine system 20 in which a publisher 22 publishes and electronically distributes a magazine to multiple subscribers (represented by subscriber 24) over a network 26. The network 26 is preferably a data communications network, such as the Internet. The network can be implemented using wire-based technologies (e.g., cable, telephone) or wireless technologies (e.g., satellite, RF), or a combination of both.

The subscriber 24 has a conventional computer comprising a central processing unit (CPU) 28, a monitor or display 30, a keyboard 32, and a mouse 34.

Other input devices—such as a light pen, track ball, joystick, and the like—may be substituted for or used in conjunction with the keyboard and mouse. The CPU 28 is of standard construction, including memory (disk, RAM, graphics), a processor (e.g., 486 or better), and a network port for accessing the network 26. The network port might be a network card which enables direct connection to the network, or a modem which performs dial-up tasks to network services. In this implementation, the network functions as both the distribution medium and the back channel to the publisher.

In other implementations, the publisher 22 might electronically distribute the magazine to multiple subscribers using a broadcast medium, such as satellite, co-axial television cabling, and other types of broadcast mediums. In this case, the subscriber computer includes a broadcast tuning component—such as an RF receiver or a connection to a satellite receiver—to receive the broadcast magazine. The subscriber computer extracts the bits of data that it wants from the magazine broadcast and stores them on the local memory. The subscriber computer might further use a network connection, modem, or other communications port to connect to a back channel that enables interactive communication to the magazine publisher.

Although the subscriber system is shown as a computer with a monitor, it is noted that other computing units and/or displays may be employed to receive and present the electronic magazine. For instance, the display might be implemented as a television which receives the electronic magazine over a cable network or wireless broadcast network. Additionally, proposed technology is expected to consolidate televisions and computers to produce a single receiver, display, and computing unit which is capable of performing both the computing and television functions traditionally reserved for separate machines. In the context of this invention, the term "display" is not limited to any form or type of monitor or receiving device, nor to any type of distribution network or transmission format. Accordingly, a display might include televisions, television/set-top box units, computer monitors, laptop displays, hand-held devices and the like. For purposes of discussion, however, an implementation of the invention will be described in the context of a familiar personal computer with a monitor.

The subscriber's computer runs an operating system which supports multiple applications. The operating system is stored in memory in the CPU 28 and executes on the processor. The operating system is preferably a multitasking operating system which allows simultaneous execution of multiple applications. The operating system employs a graphical user interface windowing environment which presents the applications or documents in specially delineated areas of the display screen called "windows." One preferred operating system is a Windows® brand operating system sold by Microsoft Corporation, such as Windows® 95 or Windows® NT or other derivative versions of Windows®. However, other operating systems which provide windowing environments may be employed, such as the Macintosh Finder from Apple Corporation and the OS/2 Presentation Manager from IBM.

The magazine is distributed from publisher 22 over the network 26 in an electronic format, which is preferably digital. The digital magazine data flows through the network port and is stored on the subscriber's computer. A software magazine application is stored on the CPU memory and runs on the operating system to facilitate presentation of the magazine data in a visually appealing arrangement. Preferably, the magazine application presents the digital data in a multimedia environment, which includes text, graphics, sound, and video.

A graphical user interface is used by the magazine application to present the electronic magazine on the subscriber's display. An initial or timeline navigation screen of the graphical user interface is shown on the display 30 in FIG. 1. The timeline navigation screen, which is generally referenced as number 36, can be accessed from different parts of the magazine application. Additionally, there may be other navigation screens in addition to this one including, for example, a traditional contents listing, or a hierarchical folder view.

The timeline navigation screen 36 presents numerous article boxes 38 overlaid on a background pattern 40. The article boxes 38 are representative of articles contained in the magazine. The term "article boxes" is used herein to convey a meaning of bounded regions depicted on the screen which distinguish one article from another. The term "box" is not intended to imply geometric shape as such regions can be any shape and are not limited to square, rectangular, or other symmetric or convex shape. Moreover, the term "article" is not intended to imply that the box content is merely text. An article box is an insignia of some shape, size and presentation that provides the reader with an indication of the related magazine article. The article box might consist of text, a picture identifying the article, an excerpt from a video clip, or a combination of these. For instance, an article on traveling in New York might have an article box consisting of a picture of the Statute of Liberty; or a regular article on politics might have an article box showing a symbol of the Nation's Capital. Titles, author names, subject matter summaries, and the like might also be included as part of the article box. The box might also contain a running video trailer to the article.

Items maintained in electronic databases which may be offered as part of the online magazine come in many media types, including text, audio, pictures, graphs, and video. The media type of the underlying item might be represented by a "thumbnail" on the article box. The "thumbnail" is a small piece of data extracted from the item, such as a small video animation, or sound bite, or a fragment of a picture. The thumbnails aid the reader in understanding how the article is presented, and in which type of media.

Figure 2:
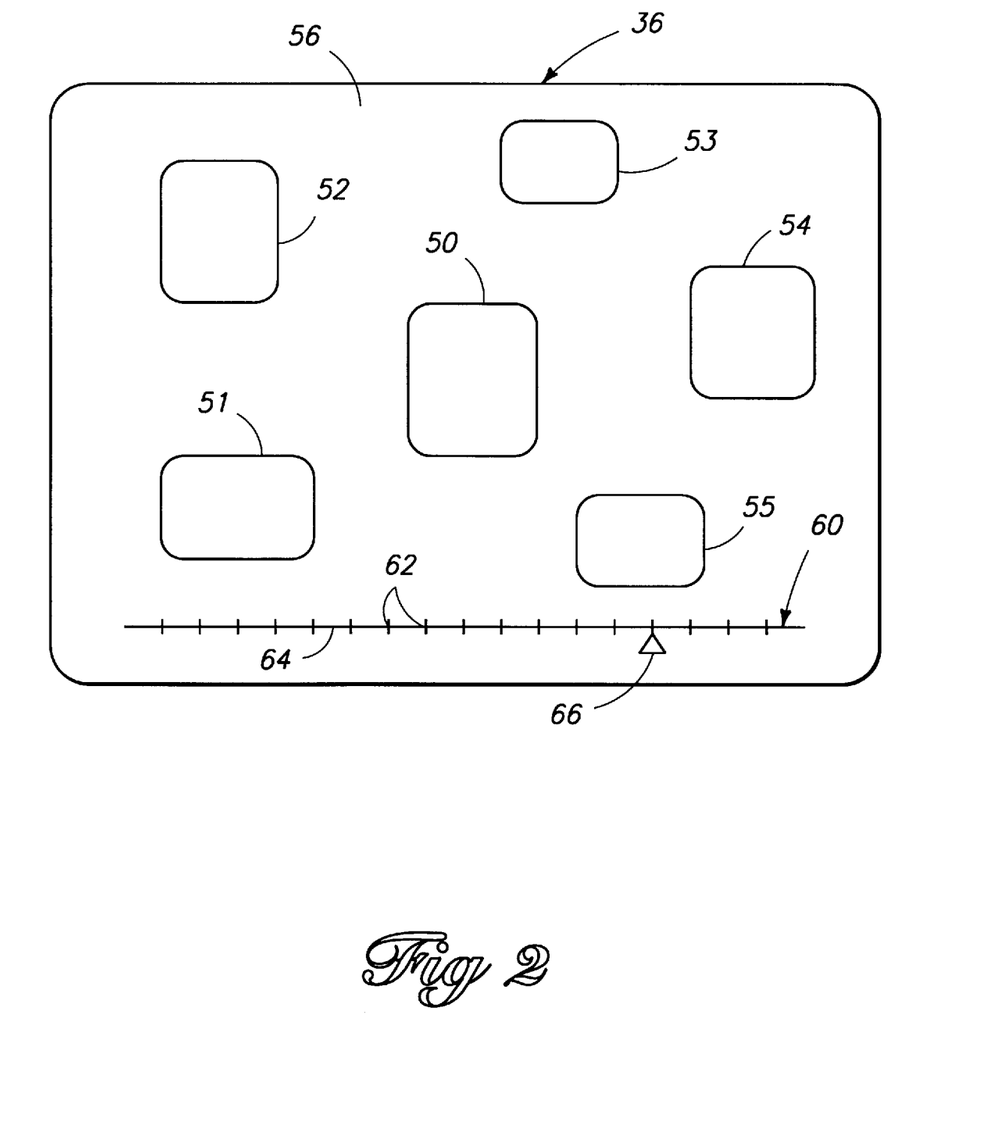
FIG. 2 is a diagrammatic illustration of a screen presented as part of a graphical user interface employed by the electronic magazine.

FIG. 2 shows the timeline navigation screen 36 in more detail. Timeline navigation screen 36 is illustrated as having six article boxes 50–55 overlaid on a background screen 56. Although not shown, the timeline navigation screen 36 might also include a title of the magazine, a publisher name, and other publication information (date, copyright, volume, issue number, etc.). To read a particular article, the subscriber maneuvers to a particular article box using his/her mouse pointer or keyboard arrow keys, and activates a hot spot on the article box using the mouse button or keyboard enter key. The hot spot activation calls up the magazine article either directly from the computer memory if the article has been previously downloaded, or from the publisher over the network. The article is then organized in a visually appealing and readable format which can be viewed on the monitor, or printed out on a printer.

In the illustrated implementation, a two-dimensional time line 60 is presented along the bottom of timeline navigation screen 36. The time line encompasses the publishing period for this issue of the magazine. For example, the magazine might be published on a monthly schedule, with articles and subscriber-supplied commentaries being added throughout the month. The time line 60 has vertical tick marks 62 arranged along a horizontal line 64. In this example, the tick marks might represent days of the month with each tick mark being labeled with a corresponding date number. An indicator, which is shown as a pointer 66, is situated along the time line 60 to identify different times within the publishing period. The subscriber can manipulate the indicator 66 using a mouse or keyboard to slide it along the time line 60. As the indicator is slid, article boxes are added or removed to demonstrate which articles were published at which times within the publishing period.

Figure 3:
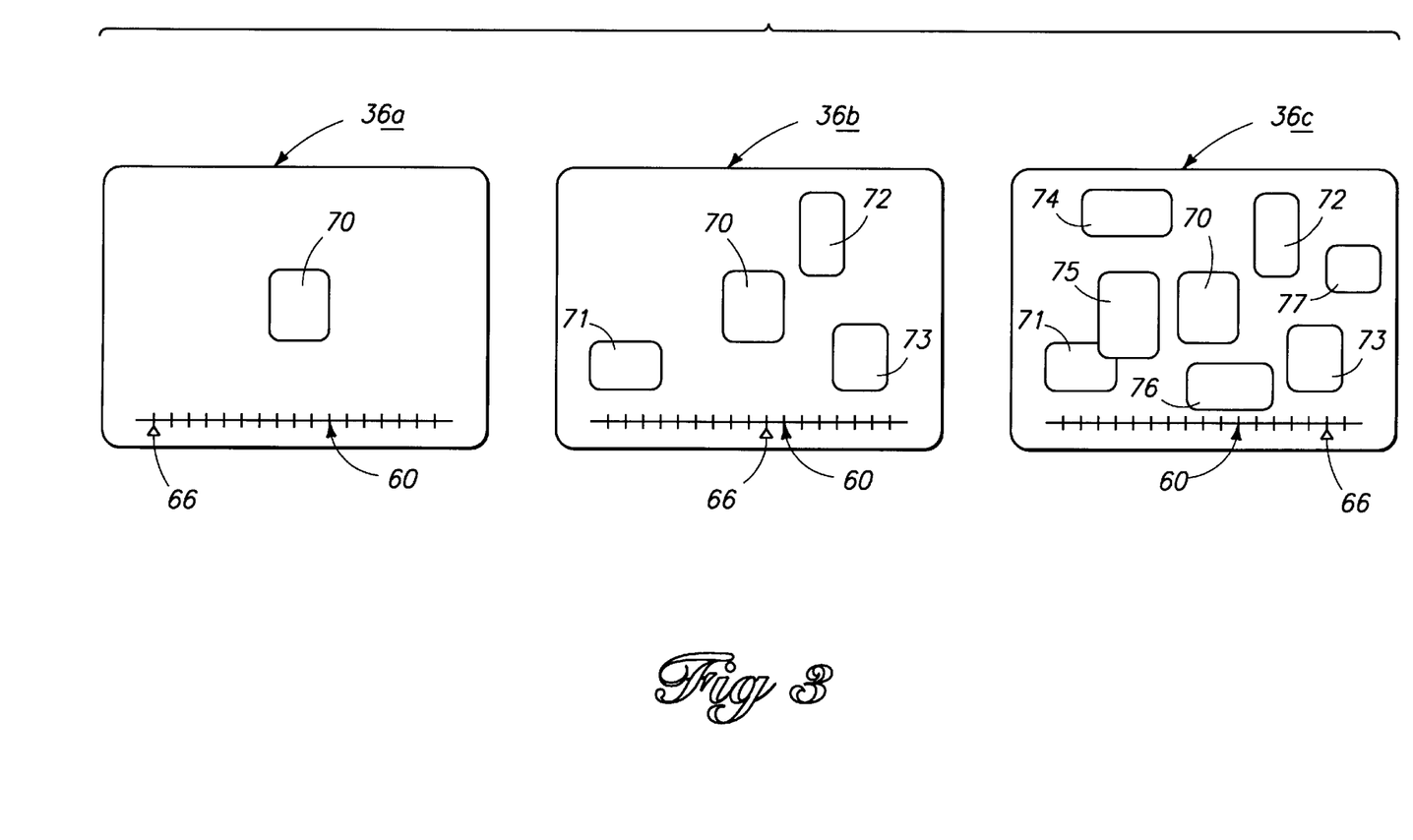
FIG. 3 is a diagrammatic illustration of the FIG. 2 screen, shown at three different time line positions to demonstrate evolution of stories within a publishing period.

FIG. 3 shows the timeline navigation screen 36 at three different instances as the subscriber moves the indicator 66 along the time line 60. In this illustrated example, the time line 60 is arranged to cover one publishing period, with the leftmost end representing the beginning of the publishing period and the rightmost end corresponding to the end of the publishing period. The first or leftmost screen 36a shows the indicator 66 at the leftmost end of time line 60. This point corresponds to the beginning of the publishing period when, perhaps, only one feature article has been published. An article box 70 indicative of the feature article is located in the center of screen 36a.

As the subscriber moves the indicator 66 rightward along the time line 60, more article boxes begin to appear in correspondence with their publication dates throughout the month-long publishing period. Center screen 36b shows the indicator 66 approximately intermediate of the time line 60. Here, article boxes 71–73 representing articles published since the beginning of the publishing period and until this intermediate point are added to the screen. The article boxes 71–73 are arranged somewhat randomly about the centrally located feature article box 70. In other configurations, the feature article box 70 might be located in another prominent location with the subsidiary article boxes 71–73 flowing from it. For instance, one of the many equivalent presentation formats might be to position the feature article box 70 in the top left-hand corner of the screen, and have successive waves of dependent article boxes 71–73 in concentric quarter-circles.

Continuing to move the indicator 66 rightward along the time line 60 produces screen 36c. In this screen, the indicator 66 is at a position corresponding to the terminating portion of the publishing period. Article boxes 74–77 have been added to represent articles published during the latter half of the publishing period.

The subscriber can slide the pointer leftward to move in reverse chronological order from screen 36c to screen 36b to screen 36a. This backward traversal of the time line causes the article boxes to be removed one-by-one from article box 77 down to article box 71 until only feature article box 70 remains.

Accordingly, sliding the indicator 66 along the time line 60 in a direction which corresponds to moving from a beginning of the publishing period toward an end of the publishing period (rightward in the screens of FIG. 3) results in addition of article boxes. Conversely, sliding the indicator 66 along the time line 60 in a direction which corresponds to moving from an end of the publishing period toward a beginning of the publishing period (leftward in the screens of FIG. 3) results in removal or deletion of article boxes.

Some article boxes may only persist for a subset of the publishing period. For example, boxes containing links to advertiser's products or special offers from the publisher might change on a daily or weekly basis. For such transitory boxes, the time line 60 identifies the times in which the boxes were displayed to the subscriber during the publishing period. As the subscriber moves the indicator 66 along the time line 60, the transitory boxes might appear one day or time period, and then disappear on the next day or time period.

Although this has been described in the context of articles, the same time line can be used to show evolution of commentaries on articles. For instance, box 70 might represent a selected article and boxes 71–77 represent subscriber commentaries that were added by the publisher throughout the publishing period. This aspect is explained further with respect to FIG. 5.

The graphical user interface can be configured to graphically change the appearance of the time line to indicate whether dates within the publishing period have elapsed. For example, the portion of the time line and tick marks associated with past dates that have elapsed is shown in regular or bold text, whereas the portion of the time line and tick marks associated with future dates is displayed in faint text. The indicator 66 is restricted to the most recent date, and cannot slide to future dates.

In another implementation, the dynamic relationships between discrete times within the publishing period and corresponding article boxes can be presented in a three-dimensional manner. For instance, the timeline might be implicit in a recession from or to a picture plane using a zoom feature represents time differences. Earlier times in the publishing period are at one zoom value relative to the picture plane and later times in the publishing period are at a different zoom value. The article boxes would again appear and disappear as the user zooms in and out in a manner representing traversal of the timeline.

The time line aspect of this invention advantageously provides a visual publication chronology of articles and/or comments. The dynamic grouping of article boxes is cohesive and easy to understand from the user perspective.

Figure 4:
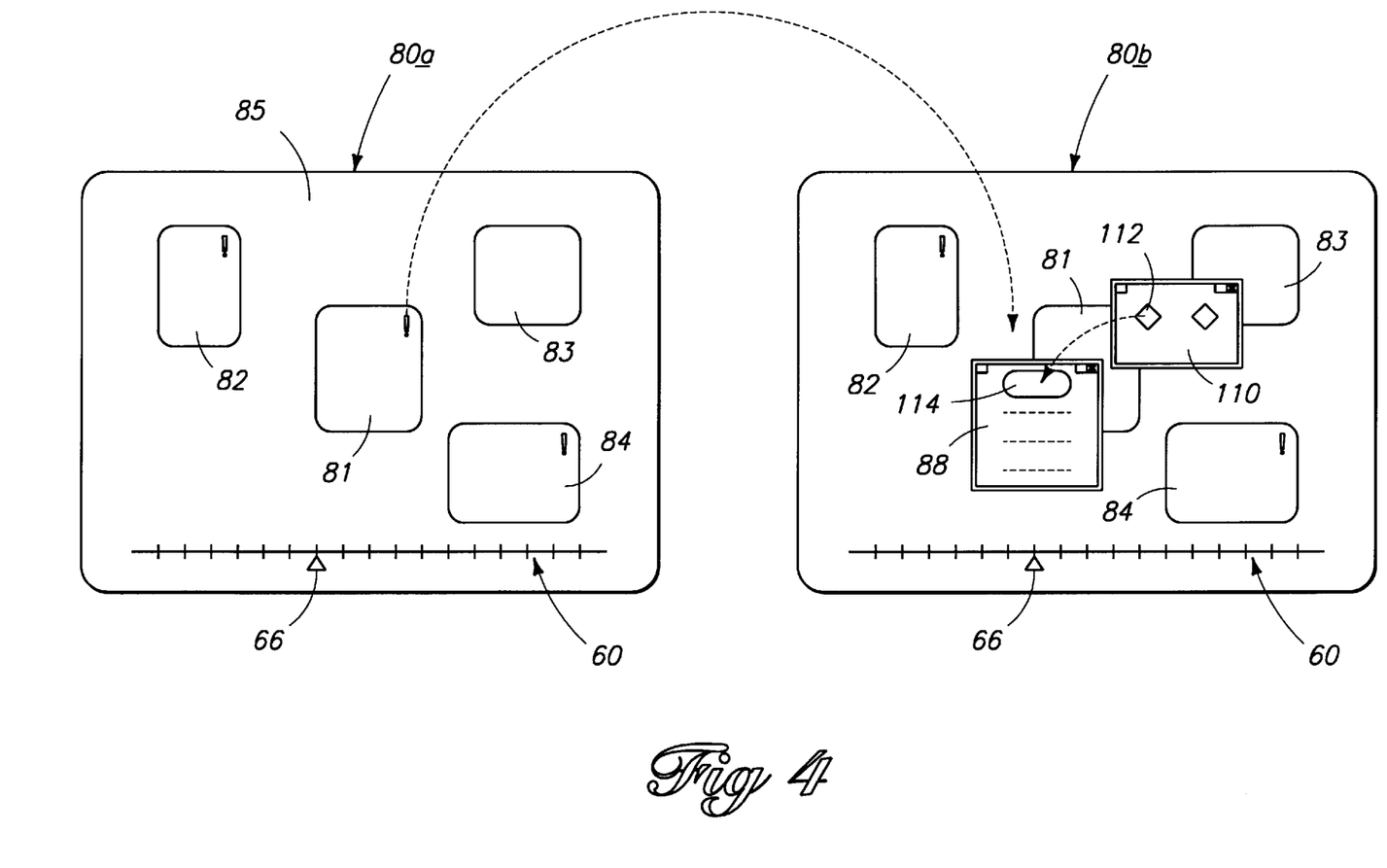
FIG. 4 is a diagrammatic illustration of two screens from the graphical user interface, and shows construction of a message thread according to one implementation of this invention.
Figure 5:
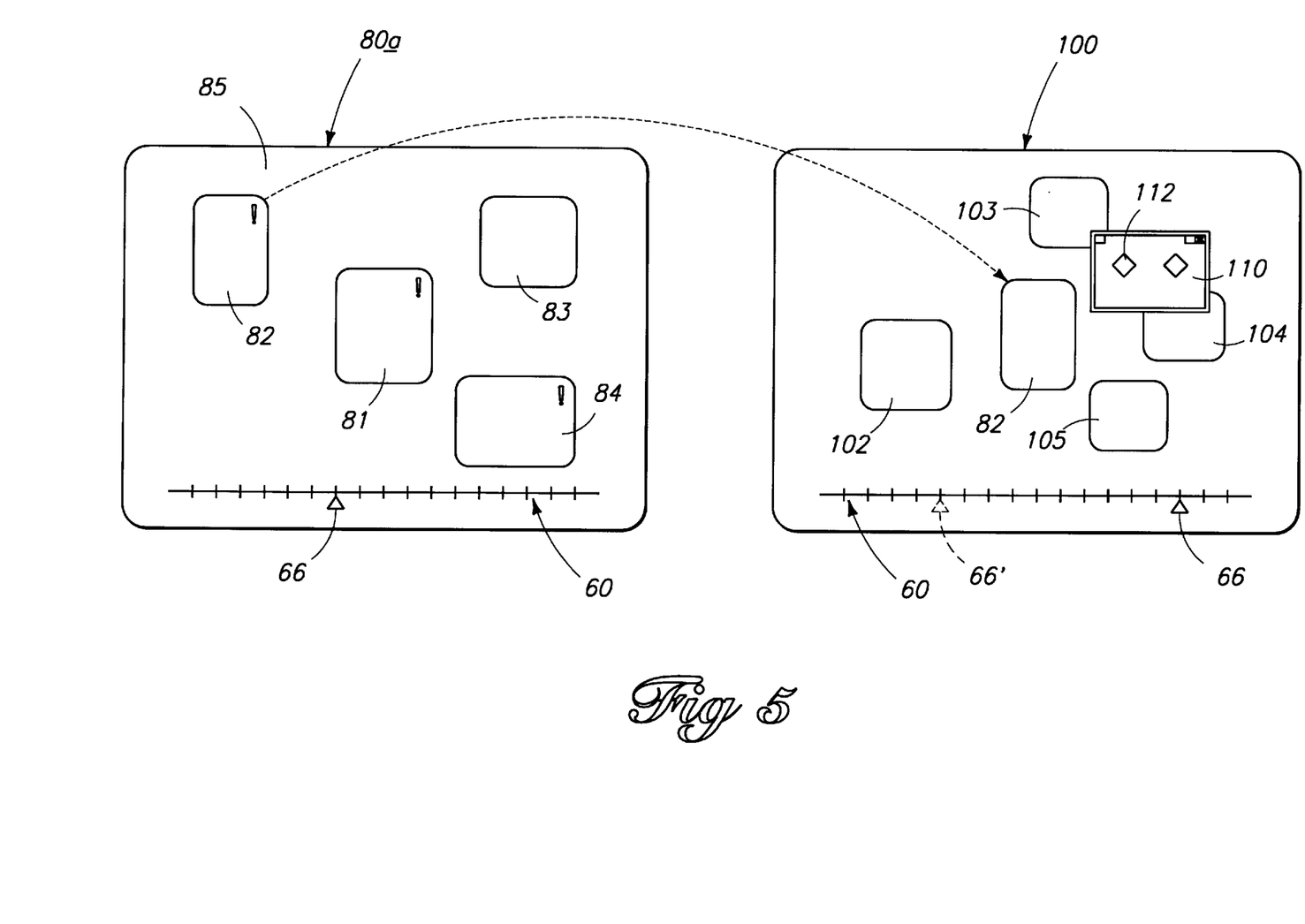
FIG. 5 is a diagrammatic illustration of two screens from the graphical user interface, and shows construction of a message thread according to second implementation of this invention.

FIGS. 4 and 5 demonstrate two methods for presenting a message thread consisting of magazine articles and comments that subscribers submit in reaction to the articles. FIG. 4 shows two different instances of the timeline navigation screen, referenced here by numbers 80a and 80b. The original timeline navigation screen 80a has multiple article boxes 81–84 arranged on a background 85. A marker is added to certain article boxes to indicate that commentaries have been published on the articles. In FIGS. 4 and 5, the marker is in the form of an exclamation point "!." Magazine articles represented by boxes 81, 82, and 84 have commentaries thereto as indicated by the exclamation point "!", while the article represented by box 83 does not have any commentaries as noticed by the absence of an exclamation point.

To view a message thread of a selected article, the subscriber clicks on the exclamation point "!" for the particular article. For instance, suppose that the subscriber activates the marker for article box 81. This activation launches a pop-up graphical list window 88 containing a list of comments related to the magazine article, as shown in timeline navigation screen 80b. The list window 88 is overlaid partly on the article box 81 to visually indicate that the article is the first story in the thread, followed by the comments thereto. Each listing might include a title, author, date of submission, length, and other descriptive information. The comments are arranged in the list according to order of publication. The subscriber can proceed to a related commentary by selecting it from the list window 88. When one is selected, the computer initiates a request to the publisher or to an independent location on the network which stores the commentary. The commentary is downloaded over the network to the subscriber's computer for viewing.

FIG. 5 shows an alternative method for presenting a message thread. FIG. 5 shows two different screens presented by the graphical user interface, including a timeline navigation screen 80a (which is the same as in FIG. 4) and a secondary screen 100. To view a message thread of a selected article, the subscriber selects an article box for that article. In this example, the article box 82 is selected. This selection launches the second screen 100 in which article box 82 is prominently centered as the first story in the thread (or located in some other prominent location). The time line indicator can remain in the same location as it was in screen 80a, or it might be adjusted to the original date when the article was published, as indicated by indicator 66'. Alternatively, the indicator can be moved to reflect the most recent date in the time line, as represented by indicator 66 in screen 100.

Comment boxes 102–105 indicative of commentaries to the article represented by article box 82 are disbursed around the article box. "Comment boxes" are essentially the same as article boxes, with the only difference being that they represent commentaries instead of articles. As the subscriber moves the indicator along the time line 60 between positions 66' and 66, the comment boxes 102–105 will appear or disappear in chronological relationship to their place in the message thread. For example, moving the indicator from position 66' to 66 causes sequential depiction of box 102, followed by box 103, followed by box 104, and finally by box 105. The pictorial evolution of article and comment boxes provides an intuitive grouping of message threads, as well as an understanding of their temporal relationship within the thread.

The message application, through the user interface, also enables the subscriber to submit his or her own commentary to a magazine article. Suppose the subscriber has prepared a commentary on a magazine article using their normal word processing program, such as Word by Microsoft Corporation. The subscriber saves this file in a directory on the computer. To submit the commentary, the subscriber opens a window 110 showing the directory containing the file, as shown in FIGS. 4 and 5. The subscriber then selects an icon 112 which represents the commentary file, and drags the icon 112 to a submission drop target corresponding to the article to which the subscriber intends to comment. As used herein, the term "icon" includes graphical symbols, textual labels, or a combination of both. In the FIG. 4 implementation, the submission drop target might be a soft button icon 114 shown on list window 88. In the FIG. 5 implementation, the submission drop target might be the entire article box 82.

The subscriber drops the icon 112 on the drop target which directs the magazine application to automatically send the commentary file to the publisher without further intervention from the subscriber. More particularly, the magazine application requests the network port to establish a communications channel over the network to the publisher and to transmit the commentary file on the channel. Some identification of the article is also sent along with the file to inform the publisher to which article the commentary is directed.

The publisher receives the submitted commentary and determines whether to add it to the magazine. If the publisher decides to include the commentary, it will be published and distributed electronically to all magazine subscribers. The published commentary is added to the message thread and thereafter noted in the list window 88 (FIG. 4) or represented with a comment box (FIG. 5).

The drag and drop aspects of the submission technique are preferably implemented using object linking and embedding (OLE), which is commercially available from Microsoft Corporation. OLE is an extensible service architecture built on the Component Object Model (COM) which is both language independent and location independent. OLE supports an OLE Drag and Drop which is widely used in Windows®-compatible operating systems, such as Windows® 95. OLE and COM have been well documented and will not be explained in detail. For more information regarding OLE and COM, refer to *OLE 2 Programmer's Reference* and *Inside OLE 2, Second Edition*, both published by Microsoft Press of Redmond, Wash. and both of which are hereby incorporated by reference.

The message threads constructed according to the above methods are beneficial because they graphically impart the context and intuitive relationships among the stories and commentaries. Additionally, the submission method is advantageous because it permits the user to prepare commentaries on their normal authoring tool. An easy drag and drop task then automatically submits the file to the publisher. Locating the publisher, constructing a communication packet to carry the commentary file, and transmitting the commentary file to the publisher are all handled in background without burdening the subscriber with these tasks.

The combined time line, message threading, and submission features described herein afford an intuitive reading environment for an online electronic magazine that is advantageous over and distinctive from presently available architectures used in bulletin boards and electronic mail programs.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

We claim:

1. In an electronic magazine that is distributed electronically from a publisher to a subscriber, a method for submitting a comment relating to an article which appears in the electronic magazine, the article being represented as part of a graphical user interface that is presented to the subscriber on a display, the method comprising the following steps:
   locating a file containing the comment, the file having an associated file icon;
   dragging the file icon to a submission target on the graphical user interface, the submission target being associated with the article;
   dropping the file icon on the submission target;
   sending the file corresponding to the dropped file icon over a back channel from the subscriber to the publisher without user intervention; and
   sending identification of the article to which the comment in the file relates along with the file to the publisher.

2. In an electronic magazine that is distributed electronically from a publisher to a subscriber, a method for submitting a comment relating to an article which appears in the electronic magazine, the article being presented as a graphical article box in the graphical user interface that is presented to the subscriber on a display, the method comprising the following steps:
   locating a file containing the comment, the file having an associated file icon;
   dragging the file icon to the article box;
   dropping the file icon on the article box; and
   sending the file corresponding to the dropped file icon over a back channel from the subscriber to the publisher without user intervention.

3. In an electronic magazine that is distributed electronically from a publisher to a subscriber, a method for submitting a comment relating to an article which appears in the electronic magazine, the article being presented as a graphical article box in the graphical user interface that is presented to the subscriber on a display, the method the following steps:
   locating a file containing the comment, the file having an associated file icon;
   activating a portion of the article box to launch a pop-up list window listing any comment files that contain comments related to the article, the pop-up list window containing a submission target;
   dragging the file icon to the submission target on the list window;
   dropping the file icon on the submission target; and
   sending the file corresponding to the dropped file icon over a back channel from the subscriber to the publisher without user intervention.

4. In an electronic magazine that is distributed electronically from a publisher to a subscriber, a method for submitting a comment relating to an article which appears in the electronic magazine, the article being represented as part of a graphical user interface that is presented to the subscriber on a display, the graphical user interface being supplied as part of an application supporting the electronic magazine, the method comprising the following steps:
   preparing a file containing the comment using an authoring tool unrelated to and separate from the electronic magazine application, the file having an associated file icon;
   dragging the file icon to a submission target on the graphical user interface, the submission target being associated with the article;
   dropping the file icon on the submission target; and
   sending the file corresponding to the dropped file icon over a back channel from the subscriber to the publisher without user intervention.

5. In an electronic magazine that is distributed electronically from a publisher to a subscriber, a method for presenting a message thread of articles which appear in the electronic magazine and comments related to the articles, the method comprising the following steps:

graphically presenting an article box indicative of a magazine article as part of a graphical user interface that is presented to the subscriber on a display; and activating the article box to launch a pop-up graphical list window containing a list of comments related to the magazine article.

6. A method as recited in claim 5, further comprising the step of depicting a marker on the article box to indicate that the magazine article represented by the article box has at least one related comment.

7. A method as recited in claim 5 wherein the magazine is distributed electronically from the publisher to the subscriber, and further comprising the step of submitting an additional comment to the article by performing the following steps:

locating a file icon representing a file containing the comment;

dragging the file icon to a submission target on the list window;

dropping the file icon on the submission target; and sending the file corresponding to the dropped file icon over a back channel from the subscriber to the publisher.

8. A computer having a display and being programmed to execute an electronic magazine program in which an electronic magazine is distributed electronically from a publisher to the computer, the computer being directed by the electronic magazine program to perform the following steps:

graphically presenting on the display an article box indicative of a magazine article as part of a graphical user interface; and activating the article box to launch a pop-up graphical list window containing a list of comments related to the magazine article.

9. A computer-readable medium having computer-executable instructions for supporting an electronic magazine and enabling submission of a comment relating to an article that appears in the electronic magazine, the computer-executable instructions comprising:

computer-executable instructions for graphically presenting on a display an article box indicative of the magazine article as part of a graphical user interface; and computer-executable instructions for activating the article box to launch a pop-up graphical list window containing a list of comments related to the magazine article.

10. In an electronic magazine that is distributed electronically from a publisher to a subscriber, a method for presenting a message thread of articles which appear in the electronic magazine and comments related to the articles, the method comprising the following steps:

graphically presenting an article box indicative of a magazine article as part of a first screen to a graphical user interface that is presented to the subscriber on a display;

activating the article box to launch a second screen in the graphical user interface; and graphically presenting the article box and at least one comment box indicative of a comment related to the magazine article in the second screen.

11. A method as recited in claim 10, further comprising the step of locating the article box prominently in the second screen and the comment box about the article box.

12. A method as recited in claim 10, further comprising the step of depicting a marker on the article box in the first screen to indicate that the magazine article represented by the article box has at least one related comment.

13. A method as recited in claim 10 wherein the magazine is distributed electronically from the publisher to the subscriber, and further comprising the step of submitting an additional comment to the article by performing the following steps:

locating a file icon representing a file containing the comment;

dragging the file icon to a submission target on the article box;

dropping the file icon on the submission target; and sending the file corresponding to the dropped file icon over a back channel from the subscriber to the publisher.

14. A method as recited in claim 10, wherein multiple comment boxes are presented with the article box, and further comprising the following steps:

presenting a time line on the second screen, the time line representing a publishing period for the magazine; and sliding an indicator along the time line to add and remove ones of the comment boxes from the screen to demonstrate which comments were published at which times within the publishing period.

15. A computer having a display and being programmed to execute an electronic magazine program in which an electronic magazine is distributed electronically from a publisher to the computer, the computer being directed by the electronic magazine program to perform the following steps:

graphically presenting an article box indicative of a magazine article as part of a first screen to a graphical user interface that is presented to the subscriber on a display;

activating the article box to launch a second screen in the graphical user interface; and graphically presenting the article box and at least one comment box indicative of a comment related to the magazine article in the second screen.

16. A computer-readable medium having computer-executable instructions for supporting an electronic magazine and enabling submission of a comment relating to an article that appears in the electronic magazine, the computer-executable instructions comprising:

computer-executable instructions for graphically presenting an article box indicative of a magazine article as part of a first screen to a graphical user interface that is presented to the subscriber on a display;

computer-executable instructions for activating the article box to launch a second screen in the graphical user interface; and computer-executable instructions for graphically presenting the article box and at least one comment box indicative of a comment related to the magazine article in the second screen.

17. In an electronic magazine that is distributed electronically from a publisher to a subscriber, a method comprising the following steps:

graphically presenting one or more article boxes indicative of magazine articles in a screen of a graphical user interface that is presented to the subscriber on a display, the magazine articles being published at different times throughout a publishing period; and relating time within the publishing period to the article boxes so that when the user manipulates the graphical user interface to selectively identify different times within the publishing period, ones of the article boxes are added and removed from the screen to demonstrate which articles were published at which times within the publishing period.

18. In an electronic magazine that is distributed electronically from a publisher to a subscriber, a method comprising the following steps:

graphically presenting one or more article boxes indicative of magazine articles in a screen of a graphical user interface that is presented to the subscriber on a display, the magazine articles being published at different times throughout a publishing period;

presenting a time line as part of the screen of the graphical user interface, the time line encompassing the publishing period;

presenting an indicator which the subscriber can slide along the time line to identify different times within the publishing period; and adding and removing ones of the article boxes from the screen as the indicator is slid along the time line to demonstrate which articles were published at which times within the publishing period.

19. A method as recited in claim 18, further comprising the following steps:

sliding the indicator in a direction which corresponds to moving from a beginning of the publishing period toward an end of the publishing period; and adding article boxes to the screen as the indicator is slid.

20. A method as recited in claim 18, further comprising the following steps:

sliding the indicator in a direction which corresponds to moving from an end of the publishing period toward a beginning of the publishing period; and removing article boxes from the screen as the indicator is slid.

21. A computer having a display and being programmed to execute an electronic magazine program in which an electronic magazine is distributed electronically from a publisher to the computer, the computer being directed by the electronic magazine program to perform the following steps:

graphically presenting one or more article boxes indicative of magazine articles in a screen of a graphical user interface that is presented to the subscriber on the display, the magazine articles being published at different times throughout a publishing period;

presenting a time line as part of the screen of the graphical user interface, the time line encompassing the publishing period;

presenting an indicator which the subscriber can slide along the time line to identify different times within the publishing period; and adding and removing ones of the article boxes from the screen as the indicator is slid along the time line to demonstrate which articles were published at which times within the publishing period.

22. A computer-readable medium having computer-executable instructions for supporting an electronic magazine, the computer-executable instructions comprising:

computer-executable instructions for graphically presenting one or more article boxes indicative of magazine articles in a screen of a graphical user interface that is presented to the subscriber on the display, the magazine articles being published at different times throughout a publishing period;

computer-executable instructions for presenting a time line as part of the screen of the graphical user interface, the time line encompassing the publishing period;

computer-executable instructions for presenting an indicator which the subscriber can slide along the time line to identify different times within the publishing period; and computer-executable instructions for adding and removing ones of the article boxes from the screen as the indicator is slid along the time line to demonstrate which articles were published at which times within the publishing period.

23. A subscriber system for use with an electronic magazine that is distributed from a publisher to a subscriber, the subscriber system comprising:

a computer having a communications port coupled to a back channel to the publisher, a processor, and a display;

a graphical user interface executing on the processor to present a magazine screen on the display, the magazine screen containing at least one article box indicative of a magazine article; and the graphical user interface being configured to enable the subscriber to submit a comment file relating to the magazine article by dragging and dropping a file icon representing the comment file onto a submission target associated with the article to initiate sending both the comment file and identification of the article to which the comment file relates over the back channel to the publisher.

24. A subscriber system for use with an electronic magazine that is distributed from a publisher to a subscriber, the subscriber system comprising:

a computer having a communications port coupled to a back channel to the publisher, a processor, and a display;

a graphical user interface executing on the processor to present a magazine screen on the display, the magazine screen containing at least one article box indicative of a magazine article; and the graphical user interface being configured to depict a time line on the display which corresponds to a publishing period for the magazine and a slidable indicator which the subscriber can move along the time line to identify different times within publishing period so that movement of the indicator along the time line causes addition and removal of ones of the article boxes from the display to thereby visually demonstrate which articles were published at which times within the publishing period.

25. A subscriber system for use with an electronic magazine that is distributed from a publisher to a subscriber, the subscriber system comprising:

a computer having a communications port coupled to a back channel to the publisher, a processor, and a display;

a graphical user interface executing on the processor to present a magazine screen on the display, the magazine screen containing at least one article box indicative of a magazine article; and the graphical user interface being configured to relate time within a publishing period for the magazine to the article boxes so that when a user manipulates the graphical user interface to selectively identify different times within the publishing period, ones of the article boxes are added and removed from the screen to demonstrate which articles were published at which times within the publishing period.

* * * * *